(12) United States Patent
Barnes (10) Patent No.: US 9,217,489 B2
(45) Date of Patent: Dec. 22, 2015

(54) NUTATING BALANCER FOR INTERNAL COMBUSTION ENGINE

(71) Applicant: Cummins IP, Inc., Minneapolis, MN (US)

(72) Inventor: David M. Barnes, Columbus, IN (US)

(73) Assignee: CUMMINS IP, INC., Columbus, IN (US)

(*) Notice: Subject to any disclaimer, the term of this patent is extended or adjusted under 35 U.S.C. 154(b) by 437 days.

(21) Appl. No.: 13/768,999

(22) Filed: Feb. 15, 2013

(65) Prior Publication Data

US 2014/0230771 A1  Aug. 21, 2014

(51) Int. Cl.
*F02B 75/06* (2006.01)
*F16F 15/28* (2006.01)

(52) U.S. Cl.
CPC .................................. *F16F 15/283* (2013.01)

(58) Field of Classification Search
CPC ... F16F 15/1205; F16F 15/14; F16F 15/1471; F16F 15/26; F16F 15/283; F16F 15/286; Y10T 4/2183; Y10T 4/2184; Y10T 464/50
USPC .................. 123/192.2; 464/180; 74/603, 604
See application file for complete search history.

(56) References Cited

U.S. PATENT DOCUMENTS

| | | | | | |
|---|---|---|---|---|---|
| 1,342,648 | A | * | 6/1920 | Ricardo | 74/604 |
| 1,851,669 | A | * | 3/1932 | Griswold | 74/604 |
| 1,874,040 | A | * | 8/1932 | Griswold | 74/574.3 |
| 2,619,943 | A | * | 12/1952 | Monleone | 92/68 |
| 3,415,237 | A | * | 12/1968 | Harkness | 123/192.2 |
| 4,538,481 | A | | 9/1985 | Ohta et al. | |
| 5,758,615 | A | | 6/1998 | Kreuter | |
| 5,927,242 | A | | 7/1999 | Kollock | |
| 6,164,259 | A | * | 12/2000 | Brogdon et al. | 123/192.2 |
| 6,427,657 | B1 | * | 8/2002 | Egleston | 123/192.2 |
| 8,100,105 | B2 | | 1/2012 | Schober et al. | |
| 8,127,736 | B2 | * | 3/2012 | Lee et al. | 123/192.2 |
| 2004/0211383 | A1 | | 10/2004 | Koyama | |
| 2007/0289567 | A1 | | 12/2007 | Eto et al. | |
| 2009/0277414 | A1 | | 11/2009 | Lee et al. | |
| 2011/0067666 | A1 | | 3/2011 | Hashimoto et al. | |
| 2011/0247581 | A1 | | 10/2011 | Trieschmann et al. | |

* cited by examiner

*Primary Examiner* — Hung Q Nguyen
(74) *Attorney, Agent, or Firm* — Foley & Lardner LLP (57) ABSTRACT

A nutating balance device for mitigating vibrations of an internal combustion engine having a crankshaft includes a coupler coupled to the engine crankshaft. The device also includes a weight coupled to the coupler. The coupler is configured to move the weight in sync with the crankshaft. The nutating balance device can generate variable torque pulsations or moments corresponding to torque harmonic frequencies of the internal combustion engine.

19 Claims, 8 Drawing Sheets

NUTATING BALANCER FOR INTERNAL COMBUSTION ENGINE

FIELD

This disclosure relates generally to engine vibration mitigation, and more particularly to mitigating engine vibration caused by cylinder firing in slider-crank internal combustion engines.

BACKGROUND

Conventional internal combustion engines utilize a slider-crank mechanism to convert the reciprocating motion of a piston into the rotating motion of a crankshaft. The piston reciprocates within a cylinder bore, which is closed on one end by a cylinder head or other structure. The reciprocating piston motion defines a changing volume, which is minimized when the piston is closest to the cylinder head and maximized with the piston is furthest from the cylinder head. The volume changes from minimum to maximum to minimum once per revolution of the crankshaft. Each minimum to maximum event is called a stroke. In a four stroke engine, air for combustion is drawn into the volume during the first stroke. Torque is applied from the crankshaft to compress the combustion air during the second stroke. Fuel is added and is converted into heat and pressure in the combustion chamber when the volume is near its minimum. The heat and pressure act on the piston creating torque on the crankshaft during the third stroke. The magnitude of the torque varies as the mechanical advantage of the slider-crank changes and, more importantly, as the pressure dissipates due to the increased volume created by the piston motion. Exhaust gas exits the volume during the fourth stroke. The four strokes require two full rotations of the crankshaft. The torque on the crankshaft from one cylinder's four strokes is fairly neutral during the fourth and first strokes, somewhat negative during the second stroke, and strongly positive during the third stroke. This torque pulse manifests in both a rolling motion of the engine, which must be managed by engine mounts, and an output torque that oscillates about its mean, which must be managed by the driveline.

The number of combustion events per revolution of the crankshaft determines the primary order of the oscillating torque output and its corresponding oscillating engine mount motion. A four cylinder four stroke engine has a second order torque output; a six cylinder four stroke engine's torque output is primarily third order. Higher order engines have lower peak displacement in the engine mounts and lower peak instantaneous torque, hence less noise, vibration, and harshness (NVH).

The number of cylinders in an internal combustion engine plays a significant role in determining the engine's friction and heat rejection characteristics. For a given displacement, fewer cylinders will generally result in better thermal efficiency and lower friction, both of which translate into improved fuel economy. Thus, it is desirable to have engines with a low number of cylinders, or low cylinder-count engines.

Unfortunately, a low cylinder-count engine has a low primary torque order which manifests in NVH challenges in both the engine mounts and the driveline. Mount and driveline vibration of engines with higher cylinder counts are less because the torque pulses from the cylinders occur at a higher frequency and overlap with each other, which lowers the NVH. Low cylinder-count engines, on the other hand, have a lower torque pulse frequency and a higher torque pulse magnitude, which generates an unacceptable NVH.

Technologies exist to mitigate the effects of displacement on engine mounts, but most can only be tuned to manage one or a few frequencies. Said technologies cannot mitigate the firing order over the whole engine operating speed range. Said technologies are typically applied to the lowest resonance frequency of the system. The remaining frequencies generated through the full operating range of the engine remain problematic for engine torque pulsation in low cylinder-count engines. Because engine torque pulsation frequency varies with engine speed, engine mount displacement mitigating solutions that are designed for a single frequency do not adequately compensate for the torque pulsations that can occur over a wide range of engine speeds.

Additionally, the driveline, including the transmission, driveshaft, differential, and axels, of a vehicle is affected by vibrations. As with engine mounts, technologies exist to manage driveline vibrations caused by torque pulses. For example, dual mass flywheels have been used as an effective method for mitigating driveline vibrations of a specific frequency. However, such frequency mitigating technologies are applied to the driveline's lowest resonance frequency in the operating range as a means to control the worst case vibration condition. Accordingly, vibrations at other frequencies within the operating speed range are less effectively mitigated by known technologies, such as dual mass flywheels. For these reasons, the inability to manage torque pulsation has limited the desirability of high efficiency, low cylinder-count engines.

SUMMARY

The subject matter of the present application has been developed in response to the present state of the art, and in particular, in response to the problems and needs in engine vibration control art that have not yet been fully solved by currently available engine vibration mitigating and balancing systems. For example, the inventors of the present application have recognized that, while a lower number of cylinders are desirable for fuel efficiency, the fewer number of cylinders an engine has, the harder it is to manage vibration from the engine due higher peak instantaneous torques and low vibratory torque order.

Accordingly, the subject matter of the present application has been developed to provide a device, and apparatus, and system for balancing, (e.g., canceling, countering, and mitigating) engine vibrations resulting from torque pulsations generated from combustion events acting on the pistons of the engine.

According to one embodiment, a nutating balance device for balancing vibrations of a slider crank internal combustion engine having a crankshaft includes a coupler coupled to the engine crankshaft. The device also includes a weight coupled to the coupler. The coupler is configured to move (e.g., nutate) the weight in sync with the crankshaft.

In some implementations of the device, the coupler rotates the weight about an axis parallel to the crankshaft. The coupler can be configured to move the weight in an oscillatory, or nutating, manner relative to the crankshaft. The coupler can be mechanically coupled to the engine crankshaft and rotate about an axis perpendicular to the crankshaft. In some implementations, the coupler extends at least partially through a cylinder block of the internal combustion engine.

According to certain implementations of the device, the coupler includes a rotatable driveshaft and a linkage rotatably coupled to the driveshaft. The linkage is pivotable about a linkage axis of rotation that is substantially perpendicular to an axis of rotation of the driveshaft. The weight is coupled to the linkage. The weight nutates in sync with the crankshaft as the linkage rotates and is pivoted about the linkage axis. The coupler may also include a receiver that is pivotably coupled to the linkage. The receiver can be rotatable with the linkage and pivotable about a receiver axis that is substantially parallel to the linkage axis. The coupler may further include a transfer arm that is rotatably coupled to the receiver. The transfer arm can be pivotable with the receiver about the receiver axis and pivotable about a fixed axis substantially perpendicular to the rotatable driveshaft and parallel to the crankshaft. Additionally, the coupler may include an output shaft that is rotatably coupled to the transfer arm. The transfer arm can be rotatable about the output shaft and the output shaft can be pivotable with the transfer arm about the fixed axis. The weight is a first weight coupled to a first end portion of the output shaft, and the nutating balance device includes a second weight that is coupled to a second end portion of the output shaft.

In certain implementations, the device includes an output shaft axle fixed relative to a structural member of the internal combustion engine such as a cylinder block, the output shaft axle defining the fixed axis. The coupler may further include a sleeve that is co-rotatably coupled to the driveshaft, and coupled to the linkage. The linkage can be coupled to the driveshaft via the sleeve. The sleeve is movable in an axial direction along the driveshaft to effectuate movement of the weight. Movement of the sleeve in the axial direction adjusts a stroke of the nutating balance device and causes the linkage and the receiver to pivot to accommodate the compressed space during the stroke of the nutating balance device. The movement of the sleeve in the axial direction corresponds with the magnitude of torque impulses generated by the internal combustion engine. The nutating balance device may include an actuation device that is operable to move the sleeve in the axial direction. The nutating balance device may also include a biasing device that is configured to bias the sleeve in a position corresponding with no movement of the weight.

According to some implementations, the nutating balance device includes a first gear that is co-rotatably coupled to the driveshaft and a second gear that is co-rotatably coupled to the crankshaft. The crankshaft drives the driveshaft via gear meshing engagement between the first and second gears. The nutating balance device may also include an actuation device that is operable to move the weight in a radial direction relative to an axis about which the weight is movable.

According to another embodiment, an apparatus for mitigating vibration within an internal combustion engine includes a weight configured to oscillate and a coupler coupling the weight to the internal combustion engine. The coupler is operable to i) transfer power from the internal combustion engine to oscillate the weight at a fixed order with respect to engine speed according to torque harmonic frequencies of the internal combustion engine as the engine operates; and ii) transfer torque pulsations or moments generated by the oscillating weight to the internal combustion engine to mitigate the torque harmonic frequencies of the internal combustion engine. In some implementations of the apparatus, the coupler operably couples the oscillating weight to a crankshaft of the internal combustion engine. A magnitude of the torque pulsations or oscillating moment generated by the oscillating weight may be dependent on a longitudinal stroke cycle of the coupler and the radial position of the oscillating weight.

In yet another embodiment, an internal combustion engine includes a crankshaft that is rotatable about a longitudinal axis. The engine also includes a coupler that is coupled to and rotatable by the crankshaft. The coupler has a linkage that pivots about a first axis and rotates about a second axis. The first axis is perpendicular to the second axis. The engine may also include an oscillating weight that is operably coupled to the linkage to generate variable torque pulsations or moments corresponding to torque harmonic frequencies of the internal combustion engine. In some implementations, the engine includes a crankshaft gear that is rotatable with the crankshaft about a longitudinal axis of the crankshaft, and a pinion gear that is coupled to the coupler and engageable by the crankshaft gear to rotate the coupler about the first axis. The first axis is substantially orthogonal to the longitudinal axis of the crankshaft.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
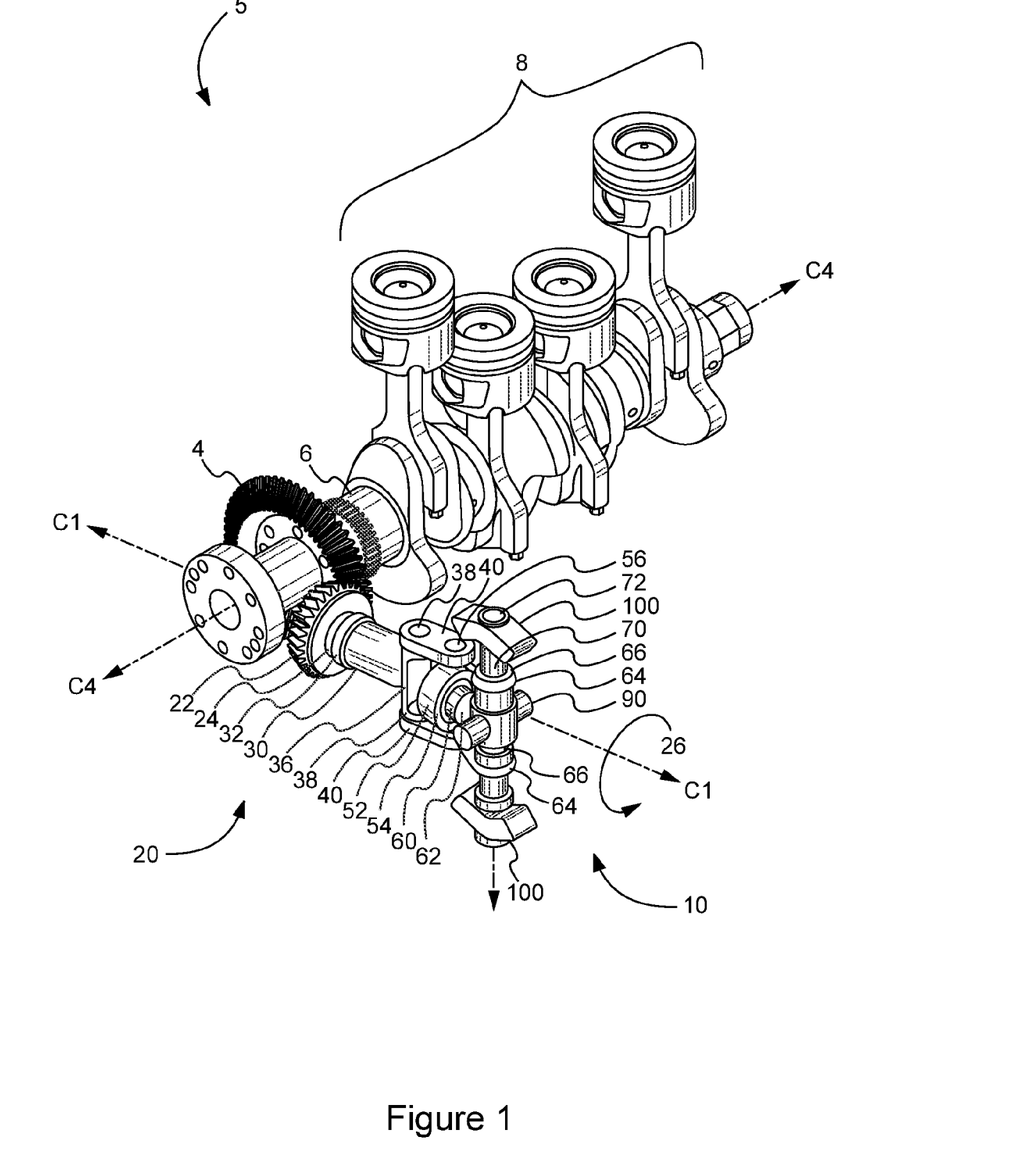
FIG. 1 is a perspective view of a nutating balancer device according to one embodiment shown coupled to a crankshaft of an engine.

Referring to FIG. 1, a nutating balance device, indicated generally at 10, is shown in accordance with one embodiment for use in mitigating or balancing torque harmonic vibrations from combustion events acting on pistons 8 within a slider crank internal combustion engine 5 by inducing and transmitting counteracting oscillating torque to a crankshaft 6 of the engine and the corresponding grounding moment on the engine. The engine block, flywheel, fan, and other associated engine parts are not shown for convenience in depicting other aspects of the subject matter of the present disclosure.

For purposes of clarification and not by way of limitation, the terms "nutation" or "nutating," and "wobble" are used interchangeably in this specification and mean an oscillatory movement of a rotating body. For example, many of the elements described below rotate about an axis, and also pivot about another axis offset from (e.g., perpendicular to) the rotational axis. The simultaneous rotating and pivoting motion cause "nutation" and "wobble."

Figure 8:
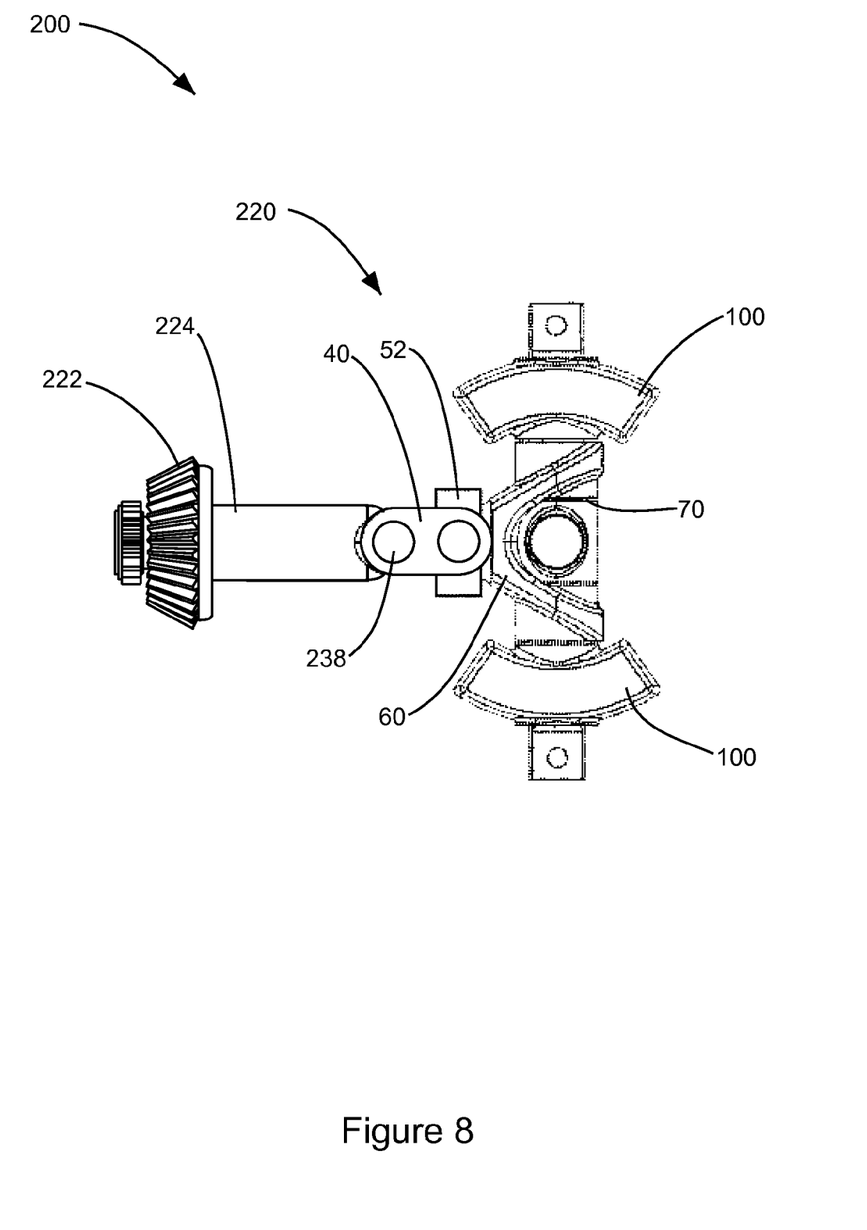
FIG. 8 is a side view of a fixed-stroke nutating balancer device in accordance with another embodiment.
Figure 9:
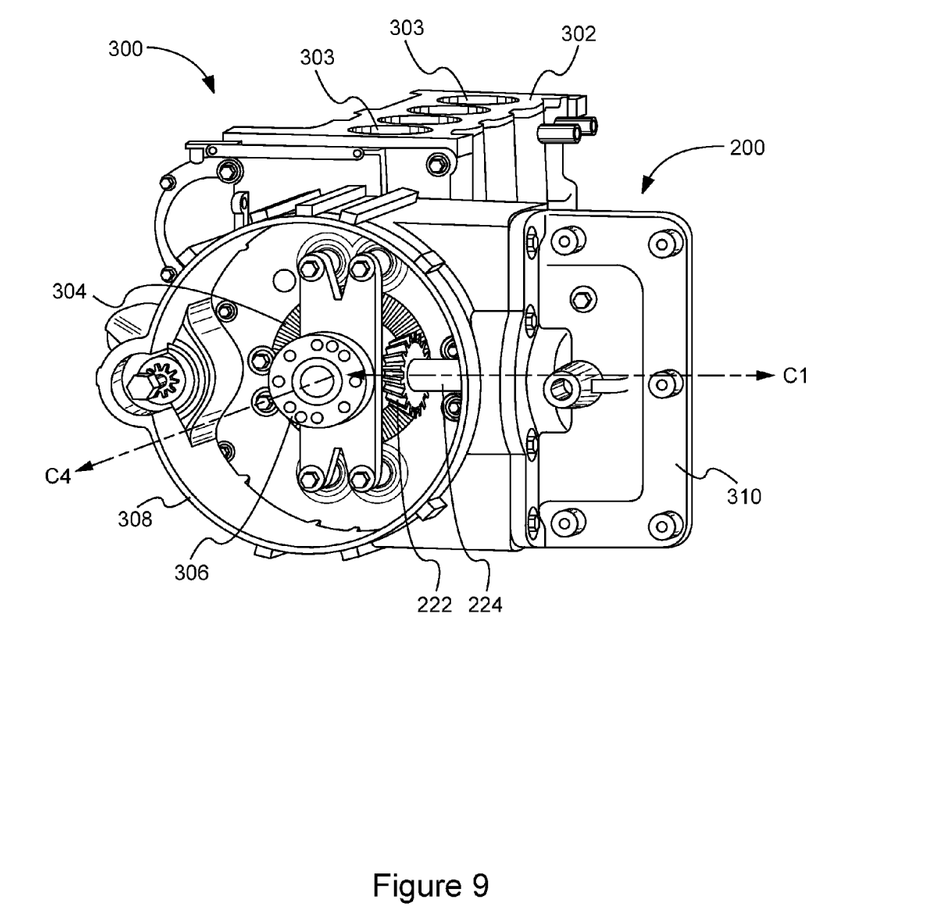
FIG. 9 is a perspective view of the fixed-stroke nutating balancer device of FIG. 8 shown in a housing coupled to an internal combustion engine.

Generally, the nutating balance device 10 balances, cancels, and mitigates vibrations resulting from torque pulsations generated from combustion events acting on the pistons of an internal combustion engine. Such balancing and cancelling of the torque pulsations can make a low-cylinder count engine's noise, vibration and harshness (NVH) rating similar to an engine with a higher number of cylinders, which is desirable to the end user of the engine. The torque pulsation NVH mitigation required by an engine to achieve the desired NVH (e.g., desired balancing torque) varies as a function of engine operating conditions (e.g., speed and load). To generate the desired balancing torque, the nutating balance device moves through a stroke cycle that generates oscillation and produces a torque pulsation vibration that can be tuned to counter the torque harmonics of the internal combustion engine. The rotating order of the nutating balance device is equal to the firing order of the engine. For example, the firing order of a four stroke four cylinder engine is second order. A nutating balance device for a four cylinder four stroke engine must have a coupler that rotates at second order, or twice the speed of the engine. The magnitude of the torque pulsation vibration and moment generated by the nutating balance device of the present application can be variable or fixed in relation to the operating conditions of the engine. The nutating balance device 10 shown in FIGS. 3-7 provides variable torque pulsation vibration and moment (e.g., variable stroke), while the nutating balance device 200 of FIGS. 8 and 9 provides fixed torque pulsation vibration and moment (e.g., fixed stroke).

In some implementations, the stroke of the nutating balance device 10 is variable and must be adjusted in a controlled manner during operation to match engine demand (e.g., engine speed and load). The nutating balance device 10 has a variable stroke S (see FIGS. 6 and 7) that is adjustable between zero stroke and a maximum stroke. When the stroke S is zero, the device 10 does not generate a balancing torque or oscillating moment. However, when the stroke S is a maximum stroke, the device 10 generates a maximum balancing torque and maximum oscillating moment. Torque pulsation vibration and stroke variability is facilitated by a variable-stroke coupler 20. The coupler 20 is coupled to oscillating weights 100. The coupler 20 and the oscillating weights 100 can be optimized to the engine size and adjustable to generate a desired balancing torque and moment. Basically, the nutating balance device 10 includes a position control element and position control logic to manage torque generation through the full operation range of the engine. As shown schematically in FIG. 2, in the illustrated implementation, the position control element is a first active element 111 (e.g., linear phaser, linear motor, etc.) that controls the stroke S of the coupler and/or a second active element 115 that controls the radial position 117 of the oscillating weights 100, and the position control logic includes an electronic control module 113. The electronic control module 113 may control the stroke S of the coupler and thus the magnitude of the balancing torque and moment based on any of various operating conditions, such as engine speed, engine load, accelerometer readings, etc., or estimated parameters, such as calculated vibrational states of the engine.

The variable-stroke coupler 20 operably couples the oscillating weights 100 to the internal combustion engine 5. The coupler 20 is coupled to the engine and rotates at the firing order of the engine using power from the engine. Rotation of the coupler 20 causes the weights 100 to oscillate. Rotation of the coupler 20 and oscillation frequency vary according to the various conditions of the engine 5. Additionally, the coupler 20 provides a coupling between the oscillating weights 100 and the engine, which transfers torque pulsations and moments from the oscillating weights 100 back to the engine 5. The torque impulses and moments transferred from the oscillating weights 100 back to the engine 5 mitigate the vibrations at the crankshaft output. Additionally, the forces (moment) generated by grounding the oscillating weights 100 add to the grounding forces (moment) generated by the pistons acting on the cylinder block to reduce engine displacement at the engine mount. As will be explained in more detail below, the couplings between the coupler 20 and the engine 5 and oscillating weights 100 in the illustrated embodiment are mechanical couplings. However, in other embodiments, the couplings can be hydraulic, pneumatic, or other type of couplings as desired without departing from the essence of the subject matter.

In the embodiment shown in FIG. 1, the variable-stroke coupler 20 has a pinion gear 22 that is operably coupleable to the crankshaft 6 of an internal combustion engine. The pinion gear 22 is coupled to a corresponding gear 4 attached to the crankshaft of the engine. The pinion gear 22 is engageable (e.g., via gear-meshing engagement) with the corresponding crankshaft gear 4 such that the pinion gear is rotatable by the crankshaft. In the illustrated embodiment, the pinion gear 22 and crankshaft gear 4 are beveled gears with flat teeth. The teeth of the pinion gear 22 and the crankshaft gear 4 provide mechanical connections between the coupler 20 and the crankshaft 6. As will be discussed in greater detail below, these mechanical connections allow transfer of oscillating torque and moment from the oscillating weights 100 back to the internal combustion engine via the crankshaft 6. Other types of gears (and non-gear arrangements) can also be used to operatively couple the coupler 20 and the crankshaft 6. For example, the pinion gear and crank shaft gear can be spur gears, helical gears, worm gears, rack and pinion gears, or other suitable type of gear as known in the art.

Figure 2:
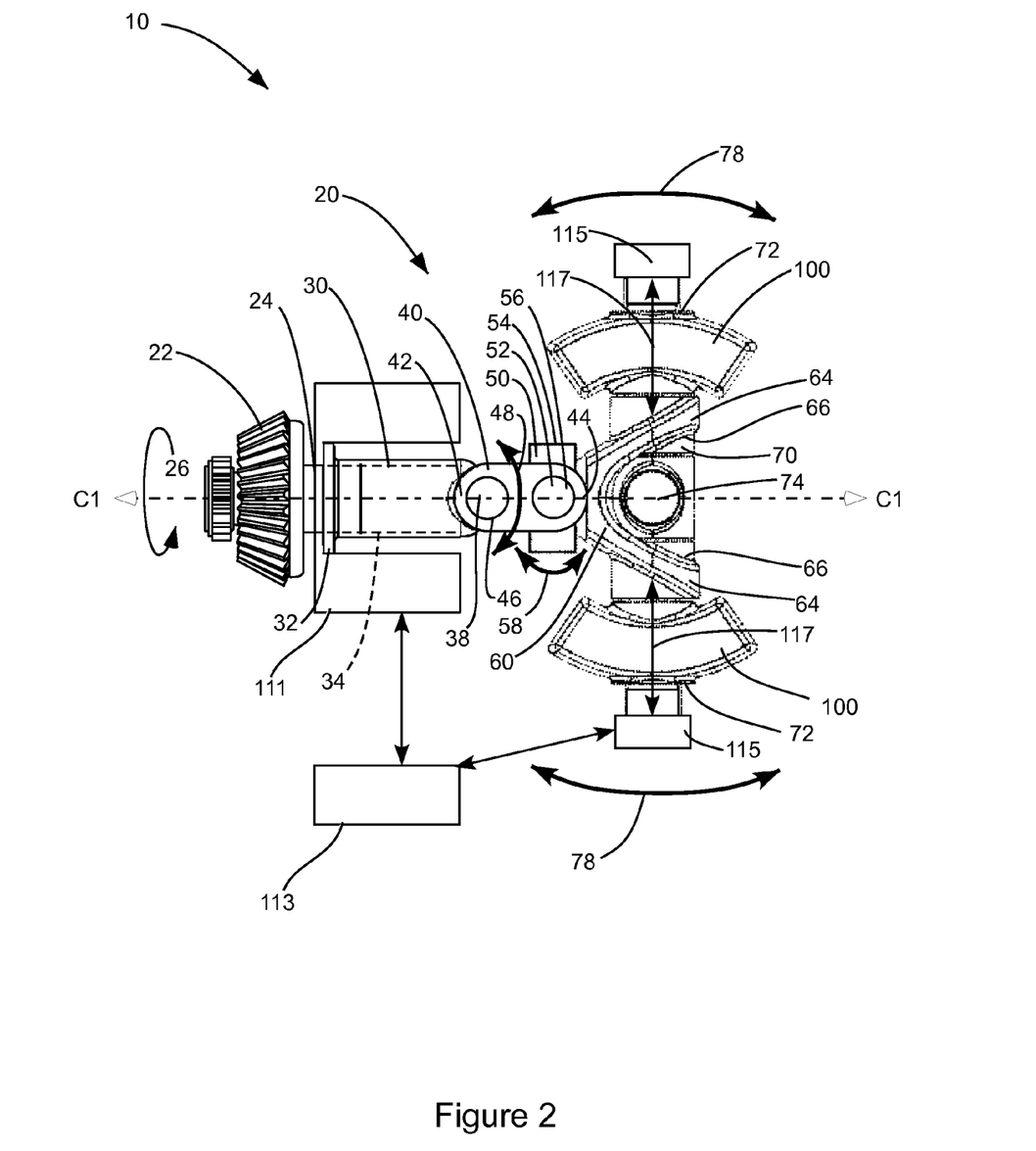
FIG. 2 is a side view of the nutating balancer of FIG. 1.
Figure 3:
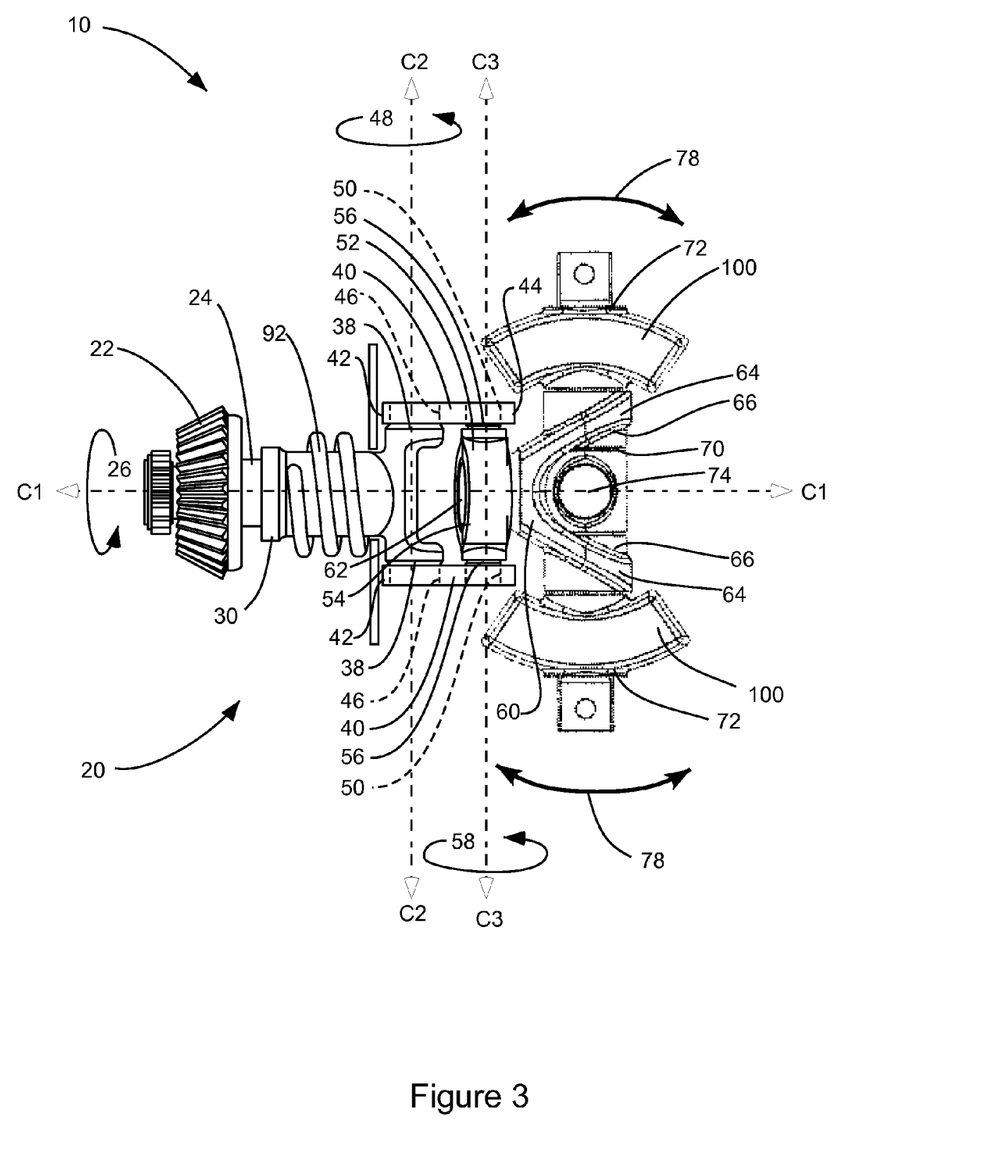
FIG. 3 is a side view of a nutating balancer similar to FIG. 2 shown in a rotated position and with a biasing device.

As best seen in FIGS. 2 and 3, the pinion gear 22 is coupled to a driveshaft 24 that extends away from the pinion gear. The driveshaft 24 is rotatable by the pinion gear 22 such that the pinion gear and the driveshaft rotate together as the crankshaft gear 4 (or just the crankshaft 6 in some implementations) rotates the pinion gear. As shown by the arrow at 26, the pinion gear and driveshaft rotate about a center axis C1 of the driveshaft. As discussed above, because the rotating speed of the crankshaft 6 (e.g., engine speed) and the coupler 20 remain in a fixed ratio equal to the firing order of the engine, the stroke S is independent of engine speed. Generally, the fixed ratio is equal to the order number such that for a second order engine, the coupler 20 rotates twice as fast as the engine or crankshaft. Likewise, for a third order engine, the coupler 20 rotates three times as fast.

The variable-stroke coupler 20 also includes a nutation drive sleeve 30 movably coupled to (e.g., disposed on) the driveshaft 24. As will be explained below, for a fixed-stroke coupler, the drive sleeve is either fixedly coupled to the driveshaft or the drive sleeve and driveshaft form a monolithic one-piece construction. The nutation drive sleeve 30 has an open proximal end 32 that allows access to a hollow interior, indicated by dashed lines at 34. The hollow interior 34 is sized and shaped to receive the driveshaft 24. The nutation drive sleeve 30 also has a closed end 36. The closed end 36 has a pair of pivots 38 extending away from each other in a radial direction substantially perpendicular to the center axis C1 of the driveshaft 24. Although the driveshaft 24 is shown as a solid shaft and the drive sleeve 30 is shown as a hollow shaft or tube, in other embodiments, the configuration can be reversed. For example, the driveshaft 24 can be hollow with the drive sleeve 30 being solid and movably positioned within the driveshaft.

The nutation drive sleeve 30 is engageable by the driveshaft 24 and rotates together with the driveshaft. Although not shown, an exemplary structure allowing engagement of the nutation drive sleeve 30 by the driveshaft 24 can include a tongue-in-groove keyway that extends longitudinally along the OD of the driveshaft and on the ID of the nutation drive sleeve. Such a keyway restricts the mating orientation of the nutation drive sleeve 30 on the driveshaft 24 to one particular rotational orientation with respect to one another. Additionally, the keyway can restrict the driveshaft 24 from independent rotation with respect to the nutation drive sleeve 30 and can engage the nutation drive sleeve such that the driveshaft and the nutation drive sleeve rotate together. Each of the driveshaft and sleeve can be made of a one-piece monolithic construction, or be made of a multi-piece construction.

Figure 6:
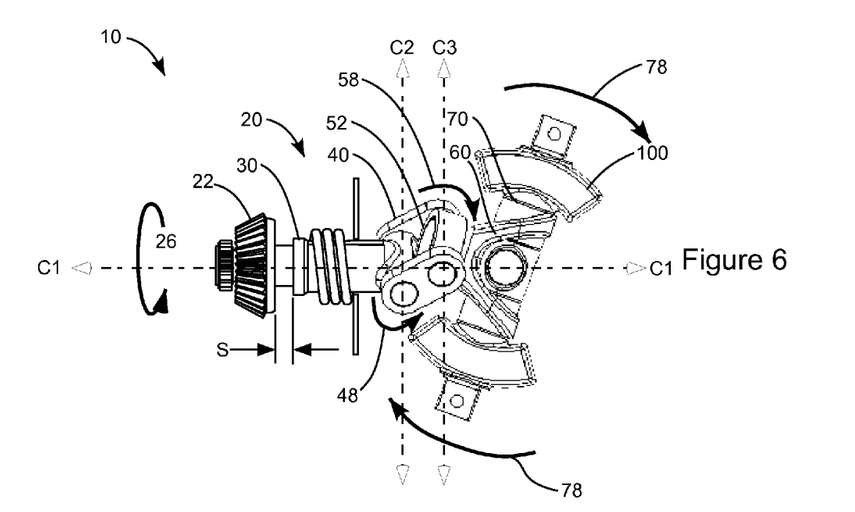
FIG. 6 is a perspective view of the variable nutating balancer of FIG. 1 shown in a second rotated orientation.

As best seen in FIG. 6, the nutation drive sleeve 30 can also move longitudinally along the centerline axis C1 of the driveshaft 24. The longitudinal movement of the nutation drive sleeve 30 defines a stroke, depicted at S, of the coupler 20. The distance of the stroke can be fixed or variable depending on the desired use of the nutating balance device 10.

In the embodiment shown in FIGS. 1-6, the stroke S of the coupler 20 is variable and varies as a function of engine load (torque). Hence, as the magnitude of an engine's torque pulsation increases at a given speed, a control device (e.g., spring) increases the stroke S of the coupler 20, or allows the stroke S of the coupler to increase, which increases the oscillatory torque and moment generated by the oscillating weights 100 to counter the increase in the engine's torque pulsation (e.g., provide an equal and opposite oscillatory torque). As discussed above, because the rotating speed of the crankshaft 6 (e.g., engine speed) and the coupler 20 remain in a fixed ratio equal to the firing order of the engine, the stroke S of the variable-stroke coupler 20 is independent of engine speed.

In certain embodiments, the variable-stroke coupler 20 may include a biasing device 90 that helps to maintain the nutation drive sleeve 30 in a zero stroke position (i.e., a position where the nutation drive sleeve has not moved longitudinally along the centerline axis C1 of the driveshaft 24). In the zero stroke position, the coupler 20 rotates with the crankshaft 6 without inducing any oscillating torque and moment. In the embodiment of FIG. 3, the biasing device 90 is a helical spring 92 that compresses to allow the nutation drive sleeve 30 to move longitudinally along the centerline axis C1 during the stroke S to vary the stroke. In some embodiments, the compression of the spring, and/or the return of the spring to an uncompressed state, can be facilitated by actively controlled devices, such as the first active element 111, which can be a hydraulic cylinder.

Returning to FIGS. 2 and 3, the coupler 20 also includes a pair of linkages 40 coupled to the nutation drive sleeve 30. The linkages 40 are pivotally coupled to the pivots 38 on the nutation drive sleeve. Each of the linkages 40 is a flat bar with a rounded proximal end 42 and a rounded distal end 44. A proximal opening 46 on the proximal end 42 is sized and shaped to receive the pivot 38 on the nutation drive sleeve 30. The linkage 40 also has an opening 50 on the distal end 44.

The linkages 40 are rotatable in two directions. First, the linkages rotate with the driveshaft 24 about the driveshaft central axis C1. Additionally, the linkages 40 rotate about the pivots 38 on the nutation drive sleeve 30, as shown by the arrow at 48 (see, e.g., FIG. 2). Since the pivots 38 extend radially from the nutation drive sleeve, the central axis C2 (see, e.g., FIG. 3) of the pivots is substantially orthogonal to the central axis C1 of the driveshaft 24. Hence, the linkages 40 are pivotable in a direction 48 that is substantially orthogonal to the direction of rotation 26 of the driveshaft 24.

A receiver 52 is pivotally coupled to the distal end 44 of the linkages 40. The receiver 52 includes a collar 54 and a pair of receiver pivots 56 extending opposite one another on the collar. The receiver pivots 56 are sized and shaped to fit within the openings 50 on the distal ends 44 of the linkages 40.

The receiver 52 also rotates and pivots in two directions. First, the receiver 52 rotates with the linkages 40 as the linkages rotate with the nutation drive sleeve 30 about the driveshaft 24. Additionally, the receiver pivots 56 allow the collar 54 to pivot about a central axis C3 of the receiver pivots. The central axis C3 of the receiver pivots 56 is substantially parallel to the central axis C2 of the nutation shaft pivots 38 on the nutation drive sleeve 30, and substantially orthogonal to the central axis C1 of the driveshaft 24. Thus, the receiver 52 is rotatable in a first direction 26 with the driveshaft 24 via the linkage 40 and pivotable in a second direction, shown at arrow 58, which is substantially orthogonal to the direction of rotation 26 of the driveshaft 24.

Figure 4:
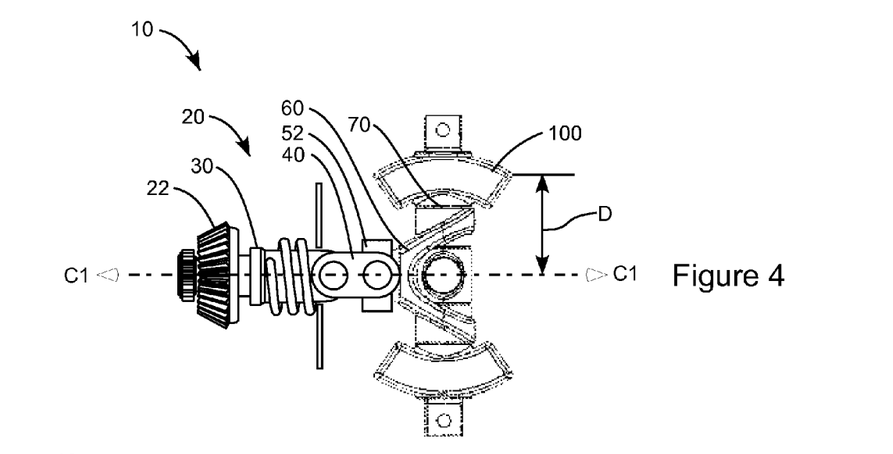
FIG. 4 is a side view of the nutating balancer device of FIG. 1 shown in an un-rotated, free state orientation.
Figure 5:
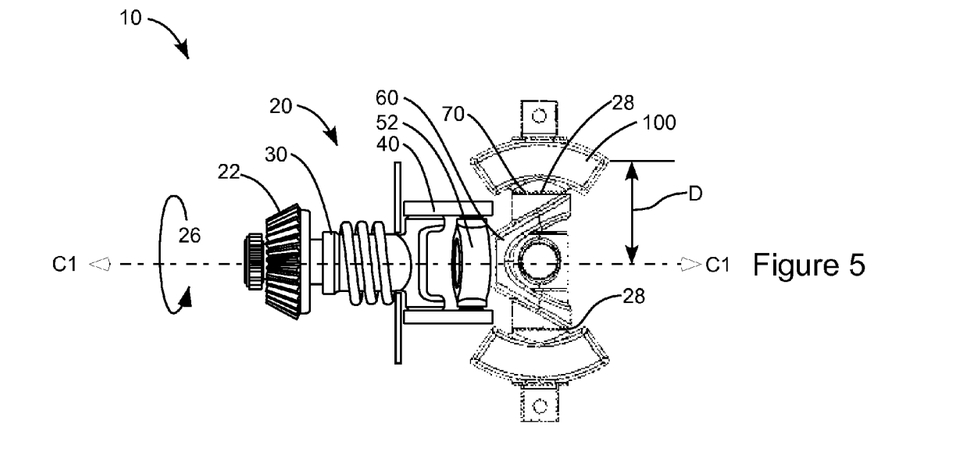
FIG. 5 is a perspective view of the variable nutating balancer of FIG. 1 shown in a first rotated orientation.

A transfer arm 60 is disposed within the receiver 52. The transfer arm 60 is Y-shaped and has a base 62 with two arms 64 extending away from the base. The base 62 fits within the collar 54 of the receiver 52. The receiver 52 rotates about the base 62 when the receiver rotates with the linkages 40. The arms 64 extend away from the base 62 and each other. Each of the arms 64 has an opening 66. The transfer arm 60 pivots with the receiver 52, as best seen in FIGS. 4-6.

An output shaft 70 is rotatably disposed in the openings 66 of the arms 64 of the transfer arm 60. The output shaft 70 has shaft ends 72 that extend through and past the openings 66 in the transfer arm 60. The transfer arm 60 is rotatable about the output shaft 70. Additionally, the output shaft 70 pivots with the transfer arm 60 as the transfer arm pivots with the receiver 52.

A fixed pivot or output shaft axle 74 is coupled to the output shaft 70 and defines a fixed axis that is fixed relative to a structural member of the internal combustion engine, such as a cylinder block of the engine. The output shaft 70 rotates about the fixed pivot 74 (e.g., fixed axis), shown at arrow 78, as the transfer arm 60 causes the output shaft to pivot. The fixed pivot 74 is coupled to a housing 310 (FIGS. 9-10) that surrounds the nutating balance device 10. The fixed pivot 74 restricts translational motion of the output shaft in a direction parallel to the longitudinal or central axis C1 of the driveshaft 24 during the stroke cycle of the coupler 20. Hence, as the linkages 40 pivot, the nutation drive sleeve 30 moves along the longitudinal axis C1 of the driveshaft 24, but the output shaft 70 remains in its relative position with respect to the driveshaft because the output shaft is held in place by the fixed pivot 74.

Returning to FIGS. 1 and 2, an oscillating weight 100 is coupled to each end 72 of the output shaft 70. The oscillating weights 100 are pivotable with the output shaft 70. The oscillating weights 100 are semicircular in shape and pivot substantially symmetrically about the fixed pivot 74 with the output shaft 70. It will be appreciated that other shapes and sizes of weights can also be used for the oscillating weights.

The oscillating weights 100 have a predetermined weight and mass that is sufficient to induce an oscillating torque and moment in the coupler 20 as the weights oscillate. The coupler 20, in turn, transfers the pulsating torque and moment to the crankshaft gear 4 (or to the crankshaft 6 via some other coupling device) and the engine 5. The induced pulsating torque and moment from the oscillating weights 100 corresponds to and counters the firing order torque harmonics of the engine 5 caused by the firing frequency. Countering the torque harmonics of the engine 5 with the induced pulsating torque and moment of the oscillating weights 100 mitigates and balances the vibrations of the engine.

Additionally, since the oscillating weights 100 are at opposing ends 28 of the output shaft 70, the oscillating weights are positioned at a distance D from a central axis C1 of the driveshaft 24 (see, e.g., FIGS. 4 and 5). The distance D, which is substantially half the length of the output shaft 70, acts as a moment arm with respect to the forces generated by the oscillating weights in relation to the central axis C1. Thus, the variable pulsating torque and moment generated by the movements of the oscillating weights 100 are amplified in magnitude by the moment arm and induce torque pulsations through the coupler 20 and into the crankshaft 6 of the engine 5. The moment forces created by the oscillating weights 100 balance and mitigate the torque pulsation forces generated by the combustion events acting on the pistons 8, which cause the engine crankshaft 6 to rotate.

FIGS. 4-7 show a rotational cycle of the nutating balance device 10 described above. FIG. 4 shows the nutating balance device 10 in a free state with no longitudinal movement of the nutation drive sleeve 30 resulting in zero stroke S. Hence, no pivoting of the linkages 40, receiver 52, transfer arm 60, output shaft 70 and oscillating weights 100 is shown.

FIG. 5 shows the nutating balance device 10 in a position rotated approximately 90 degrees from the position shown in FIG. 4, in the direction shown at arrow 26 along central axis C1. The nutation drive sleeve 30, linkages 40 and receiver 52 are rotated from the free state position, but without any axial movement, or stroke distance S, of the nutation drive sleeve 30 so that the linkages 40, receiver 52, transfer arm 60, output shaft 70 and oscillating weights 100 are still in an un-pivoted state.

FIG. 6 shows the nutating balance device 10 in a position rotated approximately 90 degrees from the position shown in FIG. 4, in the direction shown at arrow 26 along central axis C1. Additionally, the nutation drive sleeve 30 is translated in a longitudinal position along the central axis C1 of the driveshaft 24. The distance of axial translation of the nutation drive sleeve 30 is the stroke distance S. As the nutation drive sleeve 30 moves through the stroke S, the linkages 40 pivots in the direction shown at arrow 48. The receiver 52 and transfer arm 60 pivot in the direction of the arrow shown at 58. The output shaft 70 and oscillating weights 100 pivot in the direction of the arrows shown at 78. As the nutation drive sleeve 30 rotates with the driveshaft 24 and slides longitudinally along the driveshaft, the linkages 40, receiver 52, transfer arm 60, and output shaft pivot 70, thereby causing the oscillating weights 100 to oscillate.

Figure 7:
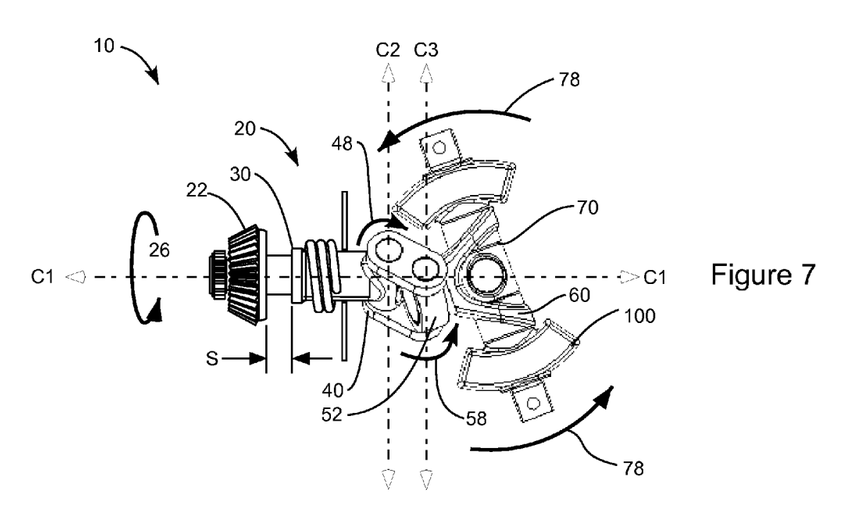
FIG. 7 is a perspective view of the variable nutating balancer of FIG. 1 shown in third rotated orientation.

FIG. 7 shows the nutating balance device 10 in another position rotated in the direction of arrow 26 with a greater stroke distance S. In this position, the linkages 40, receiver 52 and transfer arm 60 are respectively rotated, as represented by arrows 48, 58, and 78 to be more severely angled in relation to their free state. Higher pivot angles cause the output shaft 70 to pivot at a higher rate, which increases the rotational speed of the oscillating weights 100 and changes the frequency of the torque pulsations generated by the oscillating weights 100. Accordingly, the nutating balance device 10 produces variable torque pulsations to accommodate varying torque pulsation states or varying torque impulse magnitudes of the engine.

Based on the foregoing, a particular advantage of the nutating balance device 10 includes the ability to create and tune the wobbling effect of the device, which is produced by the moment arm forces of the oscillating weights, to generate an inverse harmonic frequency wave that counters the firing order frequencies of the engine to reduce the amplitude of the engine's torque harmonics. Additionally, adjustment of the radial position or mass of the oscillating weights 100 and the stroke of the coupler 20 allow for variation in matching the torque harmonic amplitude of the engine. Hence, tuning the nutating balance device 10 to an engine's torque harmonics at a specific order, such as $2^{nd}$ order for a four-cylinder four-stroke engine, reduces or even eliminates that frequency from the combined torque harmonics of the engine as the nutating balance device 10 moves through a nutation cycle as shown in FIGS. 4-7. In this manner, mechanical vibrations of the engine are reduced.

Turning now to FIG. 8, a nutating balance device 200 is shown in accordance with another embodiment for balancing engine vibrations in an internal combustion engine. The nutating balance device 200 is similar in many respects to the nutating balance device 10 associated with FIGS. 1-7. For example, the nutating balance device 200 has a coupler 220 and an oscillating weight 100. However, the coupler 220 has a fixed stroke instead of a variable stroke. To achieve the fixed stroke, the fixed-stroke coupler 220 has a pinion gear 222 and driveshaft 224, but no axially movable nutation drive sleeve. Or alternatively, the drive sleeve is fixedly coupled to the driveshaft. Instead of a drive sleeve movable along the driveshaft, the nutating balance device 200 includes pivots 238 for the linkages 40 that are coupled directly to the driveshaft 224 and remain at a fixed longitudinal location with respect to the pinion gear 222.

Accordingly, in operation, as the pinion gear 222 rotates, the driveshaft 224 rotates, which in turn co-rotates the linkages 40 and the receiver 52. The linkages 40 and receiver 52 pivot during rotation as described above and cause the transfer arm 60 and output shaft 70 to pivot, thereby oscillating the weights 100. The amount of pivot by the transfer arm 60 and output shaft 70 is a function of the length of the linkages 40 and the distance between the receiver 52 and the first pivot 238 coupled to the end of the driveshaft 224. Because the distance between the receiver 52 and the first pivot 238 is fixed to effectively fix the stroke, the relative range of rotational motion of the transfer arm 60, output shaft 70, and oscillating weights 100 is fixed and does not vary with varying engine conditions (e.g., engine speed and load). However, the frequency of the torque pulsations generated by the fixed-stroke nutation device 200 does vary with varying engine conditions. For example, as the engine speed increases, the frequency of the torque pulsations corresponding increases to match the increased frequency of the harmonic torque generated by the engine.

Because the harmonic torque generated by the fixed-stroke nutating device 200 is fixed, the device 200 should be configured to a meaningful torque and moment amplitude. For example, if the engine 5 is generating a lower amplitude of firing order harmonic torque than harmonic torque the fixed-stroke nutating device 200 is configured to generate, then operation of the device will increase the vibration of the crankshaft and engine mounts. Similarly, if the engine 5 is generating a higher amplitude of firing order harmonic torque than harmonic torque the fixed-stroke nutating device 200 is configured to generate, then operation of the device will not fully cancel the vibration caused by the firing order of the engine.

Figure 10:
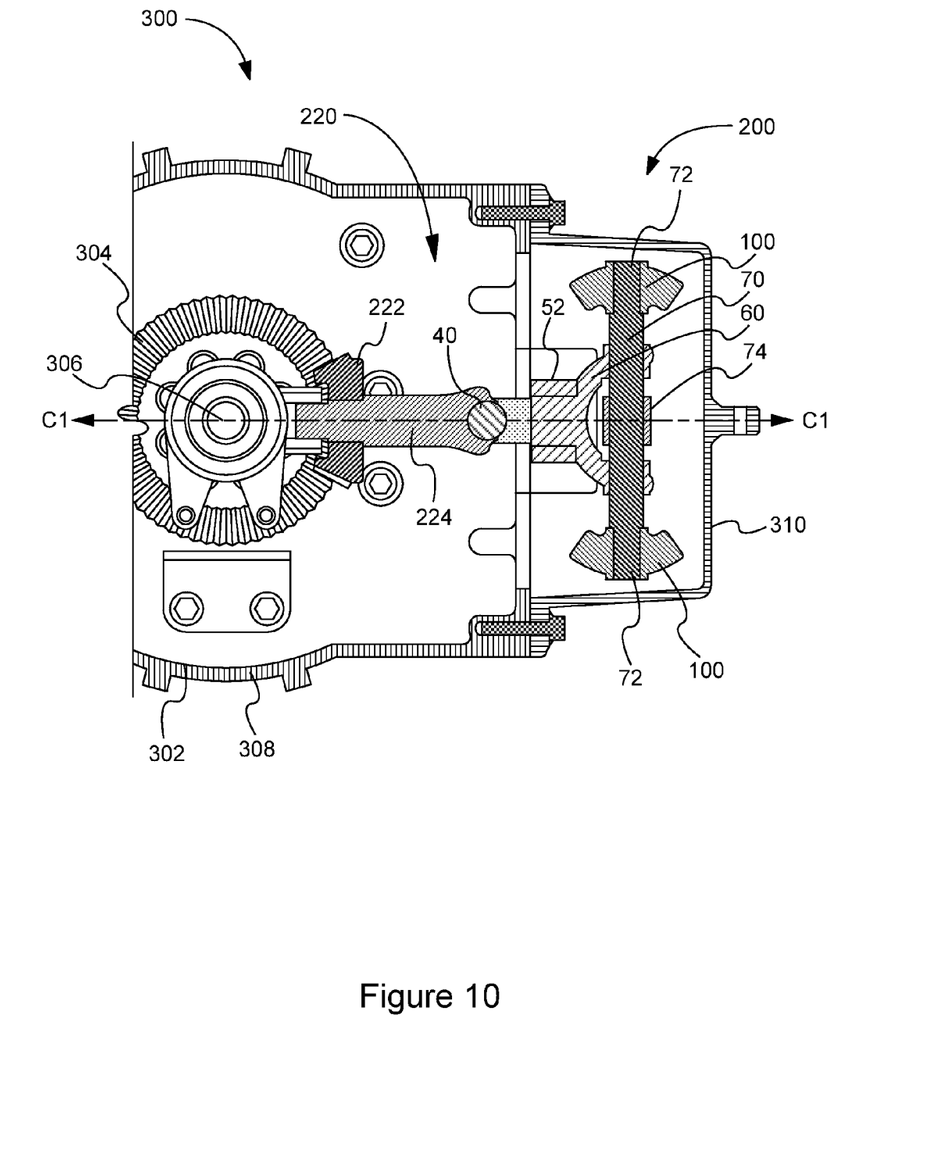
FIG. 10 is a cross-sectional view of the fixed-stroke nutating balancer device, crankshaft and housing of FIG. 8.

Referring to FIGS. 9 and 10, according to an embodiment, an internal combustion engine 300 includes a block 302. The internal combustion engine 300 can be a compression-ignited internal combustion engine, such as a diesel-fueled engine, or a spark-ignited internal combustion engine, such as a gasoline-fueled engine. Like most conventional engines, the internal combustion engine 300 includes an engine block 302 with piston cylinders 303 and pistons (not shown) coupled to a crankshaft 306. The crankshaft 306 extends from the block 302 to a flywheel located in a flywheel housing 308. The flywheel and a flywheel housing cover are not shown for convenience in depicting other aspects of the subject matter of the present disclosure. The crankshaft 306 includes a beveled, flat toothed gear 304 that co-rotates with the crankshaft about a longitudinal axis of the crankshaft.

A coupler is operably coupled to the crankshaft 306 via the crankshaft gear 304. In the embodiment shown in FIGS. 9 and 10, the coupler is similar to the fixed stroke coupler 220 shown in FIG. 8. However, in some embodiments, the coupler can be similar to the variable stroke coupler 20 shown in FIGS. 1-7. In either case, the coupler is rotatable by the crankshaft and has a linkage that pivots about an axis that is offset from the axis of rotation when the coupler is rotated by the crankshaft. Additionally, an oscillating weight is operably coupled to the linkage to oscillate at variable frequencies corresponding to rotational speeds of the crankshaft. As the oscillating weight oscillates, an oscillatory moment or pulsating torque is generated and transmitted to the crankshaft and engine mounts. The oscillatory moment corresponds to and balances the vibrations of the crankshaft and engine mounts.

In the embodiment of FIGS. 9 and 10, the coupler 220 has a pinion gear 222, a driveshaft 224, a linkage 40, a receiver 52, and a transfer arm 60. An output shaft 70 is disposed in the transfer arm 60 and oscillating weights 100 are coupled to the ends 72 of the output shaft. The output shaft 70 pivots around a fixed pivot 74. The pinion gear 222 is operably coupled to the crankshaft gear 304.

The crankshaft gear 304 and pinion gear 222 are disposed within the flywheel housing 308 of the engine 300. The driveshaft 224 extends from the flywheel housing 308 into a nutating balancer housing 310. The linkages 40, receiver 52, transfer arm 60, output shaft 70, fixed pivot 74, and oscillating weights 100 are disposed within the nutating balancer housing 310. The fixed pivot 74 is coupled to the nutating balancer housing 310 to fix the fixed pivot in place.

During operation of the engine 300, the crankshaft 306 is rotated by the pistons (not shown) which in turn rotate the crankshaft gear 304. The crankshaft gear 304 rotates the pinion gear 222, which rotates the driveshaft 224. The pinion gear 222 and driveshaft 224 are oriented to rotate the coupler 220 around the central axis C1 that is substantially orthogonal to the central axis C5 of the crankshaft.

The driveshaft 224 rotates the linkages 40 which also rotate the receiver 52. The rotation of the linkages 40 causes the linkages and the receiver 52 to pivot and move through the fixed stroke of the coupler 220. As the receiver 52 pivots, the transfer arm 60 pivots, which causes the output shaft 70 to pivot about the fixed pivot 74. The pivoting of the output shaft 70 causes the weights 100 to oscillate in a reciprocating manner thereby generating a pulsating torque and moment that is transferred back through the coupler 220 to the crankshaft 306 and the engine 300. The pulsating torque and moment is transferred back to the engine balance the vibration harmonics of the engine to reduce the overall NVH rating of the engine.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Reference throughout this specification to features, advantages, or similar language does not imply that all of the features and advantages that may be realized with the subject matter of the present disclosure should be or are in any single embodiment or implementation of the subject matter. Rather, language referring to the features and advantages is understood to mean that a specific feature, advantage, or characteristic described in connection with an embodiment is included in at least one embodiment of the subject matter of the present disclosure. Discussion of the features and advantages, and similar language, throughout this specification may, but do not necessarily, refer to the same embodiment or implementation.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A nutating balance device for balancing vibrations of a slider crank internal combustion engine having a crankshaft, comprising:
a coupler coupled to the engine crankshaft; and
a weight coupled to the coupler, the coupler being configured to move the weight in sync with the crankshaft;
wherein the coupler is mechanically coupled to the engine crankshaft and rotates about an axis perpendicular to the crankshaft.

2. The nutating balance device of claim 1, wherein the coupler is configured to rotate the weight about an axis parallel to the crankshaft.

3. The nutating balance device of claim 1, wherein the coupler is configured to move the weight in an oscillatory manner relative to the crankshaft.

4. The nutating balance device of claim 1, wherein the coupler extends at least partially through a cylinder block of the internal combustion engine.

5. The nutating balance device of claim 1, wherein the coupler further comprises a rotatable driveshaft, and further comprising:
a first gear co-rotatably coupled to the driveshaft; and
a second gear co-rotatably coupled to the crankshaft;
wherein the crankshaft drives the driveshaft via gear meshing engagement between the first and second gears.

6. A nutating balance device for balancing vibrations of a slider crank internal combustion engine having a crankshaft, comprising:
a coupler coupled to the engine crankshaft; and
a weight coupled to the coupler, the coupler being configured to move the weight in sync with the crankshaft;
wherein the coupler comprises:
a rotatable driveshaft; and
a linkage rotatably coupled to the driveshaft, the linkage being pivotable about a linkage axis of rotation that is substantially perpendicular to an axis of rotation of the driveshaft;
wherein the weight is coupled to the linkage, and wherein the weight nutates in sync with the crankshaft as the linkage rotates and is pivoted about the linkage axis.

7. The nutating balance device of claim 6, further comprising:
a receiver pivotably coupled to the linkage, the receiver being rotatable with the linkage and pivotable about a receiver axis that is substantially parallel to the linkage axis;
a transfer arm rotatably coupled to the receiver, the transfer arm being pivotable with the receiver about the receiver axis and pivotable about a fixed axis substantially perpendicular to the rotatable driveshaft and parallel to the crankshaft; and
an output shaft rotatably coupled to the transfer arm, the transfer arm being rotatable about the output shaft and the output shaft being pivotable with the transfer arm about the fixed axis;
wherein the weight is a first weight coupled to a first end portion of the output shaft, the nutating balance device comprising a second weight coupled to a second end portion of the output shaft.

8. The nutating balance device of claim 7, further comprising an output shaft axle fixed relative to a structural member of the internal combustion engine, the output shaft axle defining the fixed axis.

9. The nutating balance device of claim 6, wherein the coupler comprises a sleeve co-rotatably coupled to the driveshaft, and coupled to the linkage, wherein the linkage is coupled to the driveshaft via the sleeve, and wherein the sleeve is movable in an axial direction along the driveshaft to effectuate movement of the weight.

10. The nutating balance device of claim 9, further comprising:
a receiver pivotably coupled to the linkage;
wherein movement of the sleeve in the axial direction adjusts a stroke of the nutating balance device and causes the linkage and the receiver to pivot during the stroke of the nutating balance device.

11. The nutating balance device of claim 9, wherein the movement of the sleeve in the axial direction corresponds with a magnitude of torque impulses generated by the internal combustion engine.

12. The nutating balance device of claim 9, further comprising an actuation device operable to move the sleeve in the axial direction.

13. The nutating balance device of claim 9, further comprising a biasing device configured to bias the sleeve in a position corresponding with no movement of the weight.

14. A nutating balance device for balancing vibrations of a slider crank internal combustion engine having a crankshaft, comprising:
a coupler coupled to the engine crankshaft;
a weight coupled to the coupler, the coupler being configured to move the weight in sync with the crankshaft; and
an actuation device operable to move the weight in a radial direction relative to an axis about which the weight is movable.

15. An apparatus for mitigating vibration within an internal combustion engine, comprising:
a weight configured to oscillate;
a coupler coupling the weight to the internal combustion engine, the coupler being operable to rotate about an axis perpendicular to a crankshaft of the engine, the coupler further being operable to:
transfer power from the internal combustion engine to oscillate the weight at a fixed order with respect to engine speed according to torque harmonic frequencies of the internal combustion engine as the engine operates; and
transfer torque pulsations or moments generated by the oscillating weight to the internal combustion engine to mitigate the torque harmonic frequencies of the internal combustion engine.

16. The apparatus of claim 15, wherein the coupler operably couples the oscillating weight to the crankshaft of the internal combustion engine.

17. The apparatus of claim 15, wherein a magnitude of the torque pulsations generated by the oscillating weight are dependent on a longitudinal stroke cycle of the coupler and a radial position of the oscillating weight.

18. An internal combustion engine, comprising:
a crankshaft rotatable about a longitudinal axis;
a coupler coupled to and rotatable by the crankshaft, the coupler having a linkage that pivots about a first axis and rotates about a second axis, the first axis being perpendicular to the second axis; and an oscillating weight operably coupled to the linkage to generate variable torque pulsations or moments corresponding to torque harmonic frequencies of the internal combustion engine.

19. The internal combustion engine of claim 18, further comprising:

a crankshaft gear rotatable with the crankshaft about the longitudinal axis of the crankshaft; and a pinion gear coupled to the coupler and engageable by the crankshaft gear to rotate the coupler about the first axis, wherein the first axis is substantially orthogonal to the longitudinal axis of the crankshaft.

\* \* \* \* \*